(12) United States Patent
Davis et al.

(10) Patent No.: US 11,338,244 B1
(45) Date of Patent: May 24, 2022

(54) MULTI-STAGE TREATMENT SYSTEM AND METHODS FOR REMOVAL OF TARGET VAPOR COMPOUNDS FROM CONTAMINATED AIR STREAMS

(71) Applicant: Anua International LLC, Greensboro, NC (US)

(72) Inventors: Casey Davis, Greensboro, NC (US); Justin DaMore, Greensboro, NC (US)

(73) Assignee: Anua International LLC, Greensboro, NC (US)

( * ) Notice: Subject to any disclaimer, the term of this patent is extended or adjusted under 35 U.S.C. 154(b) by 395 days.

(21) Appl. No.: 16/392,479

(22) Filed: Apr. 23, 2019

Related U.S. Application Data

(60) Provisional application No. 62/661,495, filed on Apr. 23, 2018.

(51) Int. Cl.
*B01D 53/85* (2006.01)
*B01D 53/75* (2006.01)

(52) U.S. Cl.
CPC ............ *B01D 53/85* (2013.01); *B01D 53/75* (2013.01); *B01D 2251/95* (2013.01); *B01D 2255/804* (2013.01)

(58) Field of Classification Search
CPC ........ B01D 46/00; B01D 53/52; B01D 53/58; B01D 53/85; B01D 2221/16; B01D 46/0028; B01D 2251/95; B01D 2252/103; B01D 2257/304; B01D 2257/406; B01D 2258/06; B01D 2279/40; A61L 9/00; A61L 2209/14; C02F 3/2806; C02F 2103/00; C02F 2303/02
See application file for complete search history.

(56) References Cited

U.S. PATENT DOCUMENTS

| 6,019,810 | A  | 2/2000  | Phillips      |
| 6,969,469 | B1 | 11/2005 | Xie           |
| 7,282,081 | B2 | 10/2007 | Verscharen    |
| 7,739,833 | B2 | 6/2010  | Ramsey et al. |
| 7,919,304 | B2 | 4/2011  | Egan et al.   |
| 8,916,486 | B2 | 12/2014 | Lehman et al. |

(Continued)

FOREIGN PATENT DOCUMENTS

| EP | 2774896 B1 | 7/2017  |
| WO | 9635502    | 11/1996 |

(Continued)

OTHER PUBLICATIONS

Anua Clean Air International Ltd.—Product Brochure, 1-3, Sep. 12, 2016, available at https://plus.google.com/102621861351910668072 (as of Oct. 10, 2017).

(Continued)

*Primary Examiner* — Timothy C Vanoy
(74) *Attorney, Agent, or Firm* — Downs Rachlin Martin PLLC

(57) ABSTRACT

A multi-stage treatment system for removal of target vapor compounds from a contaminated air stream consisting of an initial bioscrubber stage utilizing a plurality of filter media derived from foamed glass immediately followed by a biofilter stage utilizing a plurality of media derived from the calcareous exoskeleton of a bivalve mollusk (shell media).

20 Claims, 8 Drawing Sheets

(56) References Cited

U.S. PATENT DOCUMENTS

| | | | |
|---|---|---|---|
| 9,376,344 B2 | 6/2016 | Ramsey | |
| 9,725,350 B2 | 8/2017 | Lehman et al. | |
| 9,790,112 B2 * | 10/2017 | Blanc | C02F 3/025 |
| 2007/0264704 A1 | 11/2007 | Van Toever | |
| 2008/0096268 A1 | 4/2008 | Herner et al. | |
| 2008/0216648 A1 | 9/2008 | Lally | |
| 2009/0095041 A1 | 4/2009 | Ramsey et al. | |
| 2010/0129895 A1 * | 5/2010 | Crawford | B01D 53/18 |
| | | | 435/262.5 |
| 2011/0206572 A1 * | 8/2011 | McKenna | B01D 53/0407 |
| | | | 422/211 |
| 2016/0038873 A1 | 2/2016 | Matheis | |
| 2017/0173526 A1 | 6/2017 | Phillips | |

FOREIGN PATENT DOCUMENTS

| | | |
|---|---|---|
| WO | 2000003789 A1 | 1/2000 |
| WO | 2002089959 A1 | 11/2002 |
| WO | 2008025365 A1 | 3/2008 |

OTHER PUBLICATIONS

Torretta V., et al., Application of multi-stage biofilter pilot plants to remove odor and VOCs from industrial activities air emissions, 225-233, 2013, Brebbia et al. (eds.), Energy and Sustainability IV, 176 WIT Transactions on Ecology and The Environment.

Kennes, Christian et al., Technologies for the abatement of odours and volatile organic and inorganic compounds; Chemical Engineering Transactions; vol. 23, 2010; ISBN 978-88-95608-14-3 ISSN 1974-9791; pp. 1-6.

Rada, Elena Cristina et al., Removal of Benzene from Oil Refinery Wastewater Treatment Plant Exchausted Gases with a Multi-stage Biofiltration Pilot Plant; Rev. Chim (Bucharest) 65; No. 1; 2014; http:/www.revistadechimie.ro; pp. 68-70.

Friedrich, Malgorzata et al., Odour Abatement of Waste Gases from Sludge Thickeners in Wastewater Treatment Plant Using Bioscrubber; Chemical Engineering Transactions; vol. 40, 2014; pp. 205-210.

* cited by examiner

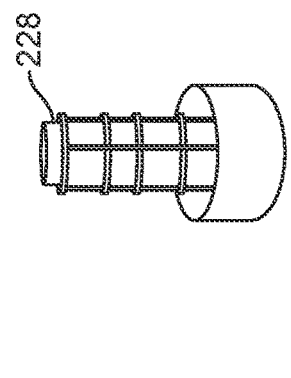
FIG. 5
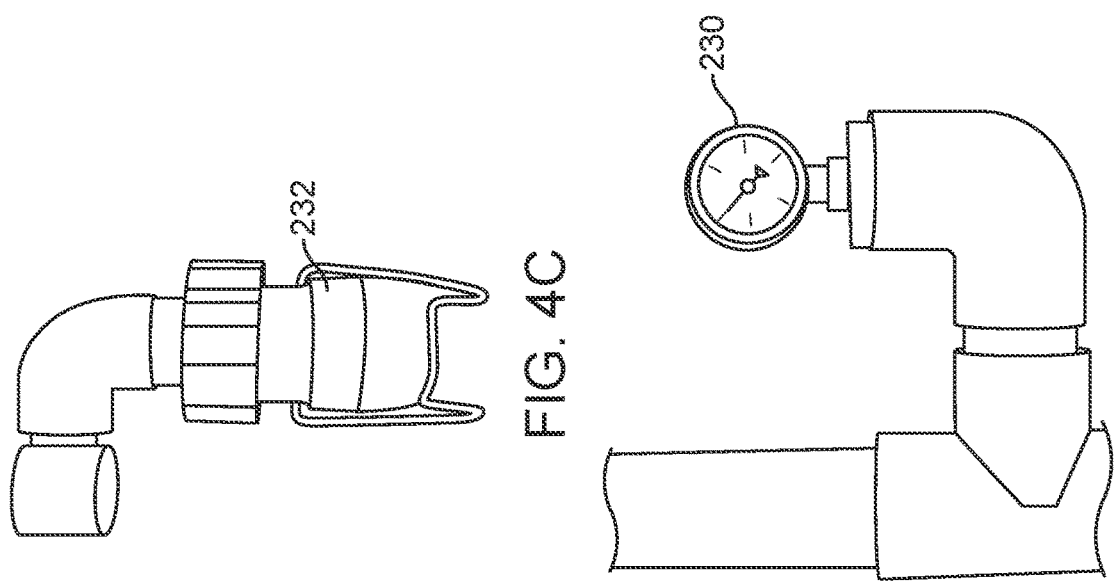
FIG. 4C
FIG. 4B
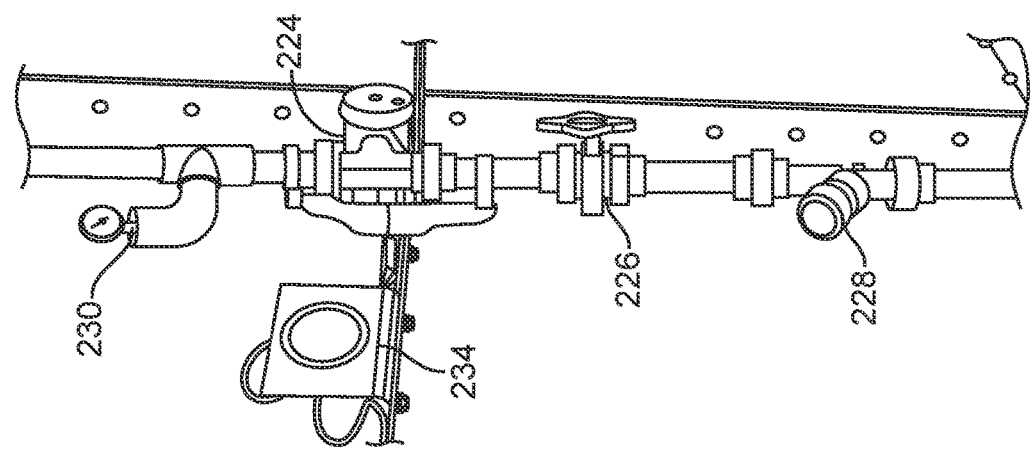
FIG. 4A

MULTI-STAGE TREATMENT SYSTEM AND METHODS FOR REMOVAL OF TARGET VAPOR COMPOUNDS FROM CONTAMINATED AIR STREAMS

FIELD OF THE INVENTION

The present disclosure is generally related to the field of odor control or corrosion protection and scrubbing of effluent air streams. In particular, embodiments disclosed herein include multi-stage treatment systems and methods for removal of target vapor compounds from contaminated air streams.

BACKGROUND

Wastewater infrastructure, composting operations, industrial manufacturing and many other processes and installations can release a wide variety of contaminants into the air. These byproducts can cause a variety of adverse effects, such as health effects, odor production, and corrosion. Treatment methods for contaminated air streams include use of biofilters in which recycled seashells are used as filter media. The shells provide a substrate for microorganisms that absorb contaminants in the air stream. In such biofilters the shell media, water, and microorganisms create a microenvironment for contaminated air treatment. An example of such a system is shown in U.S. Pat. No. 6,019,810. Multiple stage systems have also been shown in the literature, for example as disclosed in US Pub. No. 2017/0173526 A1. In such systems, the waste air stream is directed through the filter beds. This allows contact between the seashells, water, microorganisms, and the odorous or corrosive compounds. Microorganisms utilize the shell media to maintain a robust living matrix. Seashells contain high levels of $CaCO_3$, which neutralize the acid byproducts of oxidation. The physical and chemical properties of seashells can provide high level removal efficiencies when properly maintained and matched to the input waste streams.

Wastewater treatment processes, in particular, release air contaminants as a byproduct of collecting, mixing, processing, transferring and treating wastewater. Such processes release a variety of air contaminants which require specific methods of treatment per compound. While biological treatment processes are preferred in the wastewater treatment industry because they can achieve high percentage removal without the added cost associated with chemical and adsorptive removal methods, techniques such as disclosed in the above-cited US patent documents have not proven adequate for dealing with waste streams containing significant amounts of specific compounds such as hydrogen sulfide ($H_2S$). Large relative volumes of compounds such as hydrogen sulfide in the waste stream can have a disproportionally deleterious effect on shell media, thus requiring substantially larger media beds and slower flow rates to the point where certain biological filtration processes based on shell media may not be practical given siting parameters for many wastewater treatment infrastructure and other sites.

SUMMARY OF THE DISCLOSURE

In one disclosed embodiment an air treatment system comprises first and second treatment stages. The first treatment stage includes a first stage vessel with an air inlet disposed in a lower portion of the vessel and an air outlet disposed in an upper portion of the vessel. The first stage vessel contains a foamed glass aggregate media and has an irrigation system configured to recirculate irrigation fluid from a bottom drain area to irrigation outlets above the foamed glass aggregate media to provide counter-current flow of irrigation fluid with respect to air flow from the first stage inlet to the first stage outlet. The second treatment stage comprises a second stage vessel with an air inlet disposed in an upper portion of the vessel and an air outlet disposed in a lower portion of the vessel. The second stage vessel contains a shell media with an irrigation system configured to recirculate irrigation fluid from a bottom drain area to irrigation outlets above the shell media to provide co-current flow of irrigation fluid with respect to air flow from the second stage inlet to the second stage outlet. A negative pressure source communicates with the second stage outlet to draw air through the first and second stage vessels. The first stage outlet communicates with the second stage inlet to allow the airstream to pass from the first stage to the second stage whil remaining contained.

In a further embodiment, the foamed glass aggregate media may be configured to support autotrophic microorganisms, and the shell media may be configured to support at least one of heterotrophic and chemoautotrophic microorganisms. The first stage vessel may thus contain a *Thiobacillus* bacteria species and the second stage vessel may thus contain at least one of a *Nitrosomonas, Nitrobacter, Rhodococcus*, and *Pseudomonas* bacteria species and/or a fungi species.

In an alternative embodiment, an air treatment system as disclosed herein may comprise a first treatment stage including a first stage vessel containing a *Thiobacillus* bacteria species supported on a media substrate, and a second treatment stage including a second stage vessel containing at least one of a *Nitrosomonas* and *Nitrobacter* bacteria species and at least one of *Rhodococcus* and *Pseudomonas* bacteria species supported on a media substrate. The first stage vessel may define a first stage air stream inlet and a first stage air stream outlet and having an irrigation system configured to recirculate irrigation fluid through the first stage media substrate in a counter-current direction with respect to air stream flow from the first stage inlet to the first stage outlet. The second stage vessel may define a second stage air stream inlet and a second stage air stream outlet and having an irrigation system configured to recirculate irrigation fluid through the media substrate in a co-current direction with respect to air stream flow from the second stage inlet to the second stage outlet. The first stage air stream outlet communicates with the second stage air stream inlet to contain the air stream.

In such an alternative embodiment, the first stage media may comprise a foamed glass aggregate media and the second stage media may comprise a shell media with each media forming a media packing contained within first and second stage vessels, respectively. The first stage vessel may have a diameter that is between about 25% to about 65% smaller than the second stage vessel diameter. A negative pressure source may disposed at the second stage outlet to maintain a substantially constant volumetric air stream flow rate with through the system with a greater face velocity flow rate in the first stage vessel as compared to in the second stage vessel.

In yet another alternative embodiment, a method for treating an air stream to remove contaminants may comprise directing the air stream through a first media bed counter-current to a flow of irrigating fluid through the first media bed and removing about 80-95% of hydrogen sulfide from the air stream in the first media bed. A further step may comprise directing the air stream from the first media bed through a second media bed co-current with a flow of irrigating fluid through the second media bed, and removing substantially all remaining hydrogen sulfide, at least about 95% of ammonia, dimethyl sulfide when present and methyl mercaptan when present from the air stream in the second media bed.

In disclosed methods, the second media bed may comprise a substrate suitable for heterotrophic and chemoautotrophic microorganisms. The first media bed may comprise a substrate suitable for autotrophic microorganisms adapted to consume hydrogen sulfide contained within the air stream. Further, the first media bed may a foamed glass aggregate media packing disposed within a vessel containing autotrophic microorganisms such as a *Thiobacillus* bacteria species. The second media bed may comprise a shell media pacing disposed within a vessel containing microorganisms such as at least one of a *Nitrosomonas* and *Nitrobacter* bacteria species, at least one of *Rhodococcus* and *Pseudomonas* bacteria species, and at least one fungi species.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 4A, 4B, and 4C are piping details for biofilter and bioscrubber embodiments disclosed herein.

FIG. 5 is a detailed view of a strainer used in embodiments disclosed herein.

DETAILED DESCRIPTION

Figure 1:
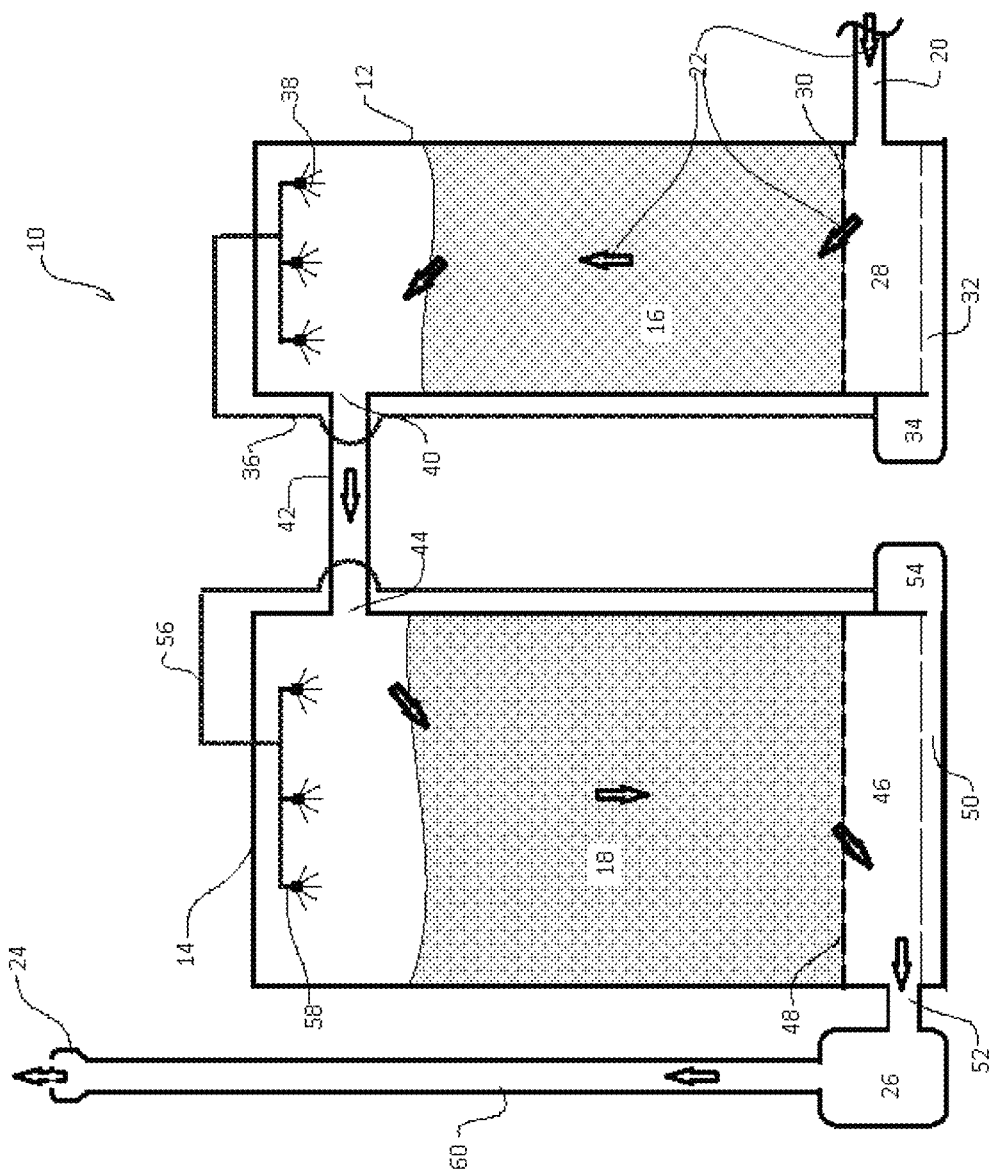
FIG. 1 is a schematic diagram illustrating a multi-stage treatment system for removal of target vapor compounds from a contaminated air stream according to one embodiment of the present disclosure.

In general, the present disclosure describes multi-stage treatment systems and methods for removal of target vapor compounds from contaminated air streams. Embodiments described herein generally comprise an initial bioscrubber stage utilizing a plurality of filter media derived from foamed glass aggregate immediately followed by a biofilter stage utilizing a plurality of shell media, such as may be derived from the calcareous exoskeleton of a bivalve mollusk. While having general applicability to treatment of contaminated or effluent air streams, embodiments disclosed herein are particularly well-suited for use in the wastewater treatment industry and other processes that produce waste airstreams containing relatively large hydrogen sulfide ($H_2S$) content Wastewater treatment processes release air contaminants as a by-product of collecting, mixing, processing, transferring and treating wastewater. Such processes release a variety of air contaminants which require specific methods of treatment per compound. Hydrogen sulfide is one such compound. Embodiments disclosed herein combine specific treatment processes into a collective biological treatment system. Biological treatment processes are often preferred in the industry as these methods can achieve a relatively high percentage removal, without the cost associated with chemical and adsorptive removal methods.

In embodiments disclosed herein, an odorous and/or corrosive waste or effluent air stream is directed through first and second stage biohybrid/biotrickling filter beds in series by a negative pressure fan. Ducting directs the inlet air stream below a plenum floor at the bottom of the first stage vessel. The first stage vessel comprises a container filled with a foamed glass aggregate media and a water irrigation system that recycles irrigation water through spray nozzles at the top. The foamed glass aggregate media is supported by a grate forming a plenum floor. The air stream flows in the opposite direction of the irrigation water in the first stage, which drains by gravity back to a sump basin, which can be formed as a part of the first stage vessel/container or as a separate tank with connecting piping. The water irrigation system is powered by a submersible sump pump or other appropriate pump matching the piping configuration. Contact in the first stage between the foamed glass aggregate, water, microorganisms, and the odorous and/or corrosive compounds provides biochemical treatment of the air stream generally provides the following functions, advantages and results:

- Remove high levels (as much as 90-95%) of Hydrogen Sulfide ($H_2S$) through an inorganic substrate that does not degrade rapidly
- Facilitate efficient removal of ammonia compounds and reduced organic sulfur compounds in the second stage shell media packing
- Extend life of second stage organic, shell-based media
- Reduce the overall footprint of the total treatment system by about 5% to about 65%, or typically by at least about 25% as compared to existing single and multi-stage biotrickling filter systems The air stream being treated exits the first stage vessel through ducting that connects to the second stage vessel at the top of the container. The second stage vessel comprises a container filled with seashells media and a water irrigation system that delivers irrigation water to the top of the media bed via spray nozzles. The seashells media is supported by a grate forming a plenum floor. The airstream in the second stage flows in the same direction of the irrigation water, which drains by gravity back to a sump basin which is either part of the second stage container or a separate tank connected by piping. The water irrigation system is supplied by a submersible sump pump or other pump selected based on the piping arrangement. The contact between the seashells, water, microorganisms, and the odorous and/or corrosive compounds provides biochemical treatment of the air stream. A chimney stack vents the treated air to atmosphere. Microorganisms utilize the seashell media to maintain a robust living matrix. Other media materials may be substituted for seashells as long as conditions consistent with the seashell media are maintained. Seashells contain high levels of calcium carbonate (CaCO3), which neutralize the acid byproducts of oxidation, which permits the second stage to provide the following general functions, advantages and results:

Remove remaining levels of $H_2S$ to approximately ≥99% through an organic substrate that has prolonged life due to the majority of $H_2S$ being treated in the first foamed glass aggregate media Remove ammonia compounds to approximately ≥98% and reduced organic sulfur compounds to approximately ≥95%

Reduce the overall footprint of the second stage container by 10% to 50%, as compared to a filter containing seashells in one or two stages Reduce or eliminate the need for further treatment of the exhausted air stream by activated carbon FIG. 1 schematically depicts an embodiment of a multi-stage treatment system and for removal of target vapor compounds from contaminated airstreams according to the present disclosure. As shown therein, system 10 includes bioscrubber vessel 12 and biofilter vessel 14. Bioscrubber vessel 12 contains foamed glass aggregate filter media packing 16 and biofilter vessel 14 contains shell media packing 18. The contaminated air stream to be treated enters through inlet 20. Flow direction arrows 22 indicate the direction of airflow through system 10 to system exhaust 24. Negative pressure fan 26 ensures a constant airflow through system 10. From inlet 20, the airstream to be treated is received in intake plenum 28 and is drawn upward from there through foamed glass aggregate filter media packing 16 as a result of the negative pressure created by fan 26. Grating 30 supports media packing 16. Irrigation is provided in a closed-loop system within bioscrubber vessel 12. Irrigation water is received in drain 32, pressurized by pump 34, and then delivered through piping 36 to spray nozzles 38. Airflow within bioscrubber vessel 12 is thus in a counter-current direction relative to irrigation flow through foamed glass aggregate media packing 16. Counter-current irrigation/air flow helps to maximize mass transfer of contaminants from the air stream to the liquid phase where it can be consumed most effectively by microorganisms in the media packing.

Foamed glass aggregate media filter packing 16 supports autotrophic microorganisms, such as *Thiobacillus* species, which exist generally only as attached to the substrate formed by media packing 16. Foamed glass aggregate suitable for biotrickling filter type applications is a porous, recycled glass product that is commercially available in a variety of sizes, shapes and porosities. Persons of ordinary skill may select an appropriate configuration for the foamed glass aggregate material based on the teachings contained herein in order to provide a suitable environment for the necessary microorganisms to thrive.

The autotropic microorganisms substantially remove hydrogen sulfide ($H_2S$) that has been transferred to the water phase from the air stream due to the counter-current flow arrangement. Anywhere from 80% to 95% of hydrogen sulfide may be removed from the airstream in bioscrubber vessel 12. It is anticipated that at least 90% of the hydrogen sulfide will be removed in this stage. Sufficient face velocity of the air stream across bioscrubber vessel 12 as the air moves therethrough is also a factor in efficient removal of contaminants in the first stage, particularly $H_2S$ removal. Due to the configuration of the foamed glass aggregate material, if air stream velocity is too low then plug flow across the vessel cross-section may not be achieved, thus reducing efficiency based on reduced air-water contact and concomitant reduced mass transfer to the water stage. In order to maintain adequate face velocity of the air stream flow, bioscrubber vessel 12 will generally have a smaller diameter than the second stage biofilter vessel 14. In general, the diameter of bioscrubber vessel 12 will be approximately 33% to 66% smaller than the diameter of biofilter vessel 14. Typically, the bioscrubber vessel diameter may be about 50% of the biofilter vessel diameter.

The air stream exits bioscrubber vessel 12 through outlet 40, which communicates with biofilter vessel 14 through air duct 42 and inlet 44. The air stream passes through shell media packing 18 into outflow plenum 46. Shell media packing 18 is supported on grate 48, which defines the top of plenum 46. Irrigation in biofilter vessel 14 is also provided in a closed-loop system with irrigation water being received in drain 50, pressurized by pump 54 and delivered through piping 56 to spray nozzles 58. Treated airflow direction in biofilter vessel 14 is co-current with the irrigation water flow through media packing 18. Co-current flow is preferred in biofilter vessel 14 because the heterotrophic and chemoautotrophic microorganisms in the second stage thrive in a suspension in the irrigation water as well as attached to the substrate formed by media packing 18. The treated airstream exists through outlet 52 and is exhausted through stack 60, which may be a no-loss stack. Remaining hydrogen sulfide, as well as other contaminants, such as ammonia, dimethyl sulfide, and methyl mercaptan, are removed in biofilter vessel 14 where shell media packing 18 supports microorganisms, such as *Rhodococcus, Pseudomonas* and fungi species (heterotrophs) and *Nitrosomonas* and/or *Nitrobacter* species (chemoautotrophs), which substantially remove ammonia ($NH_3$) from the air stream. It is anticipated that at least 95% of the ammonia will be removed in this stage. Other contaminants, such as dimethyl sulfide and methyl mercaptan are removed in biofilter vessel 14.

Use of foamed glass aggregate as the media packing in the first stage allows an overall smaller system footprint, increased shell media life in stage 2, and use of less water and less energy for irrigation. While foamed glass aggregate media packing may not be an ideal media material for removal of all contaminants, it is well-suited for removal of hydrogen sulfide because the autotrophic bacteria which perform that function require a generally acidic environment, which is particularly detrimental to shell media in terms of reducing media life and also increasing irrigation requirements. Thus, by using two stages with a first stage based on foamed glass aggregate media, the overall footprint of the system may be reduced as described above to achieve the same capacities and life cycle as compared to single stage or solely shell media based system. This means that systems with the two-stage arrangement disclosed herein may be more effectively employed in locations where biological systems could not be previously due to size limitations and/or due to overall decreased life-cycle costs.

Figure 1A:
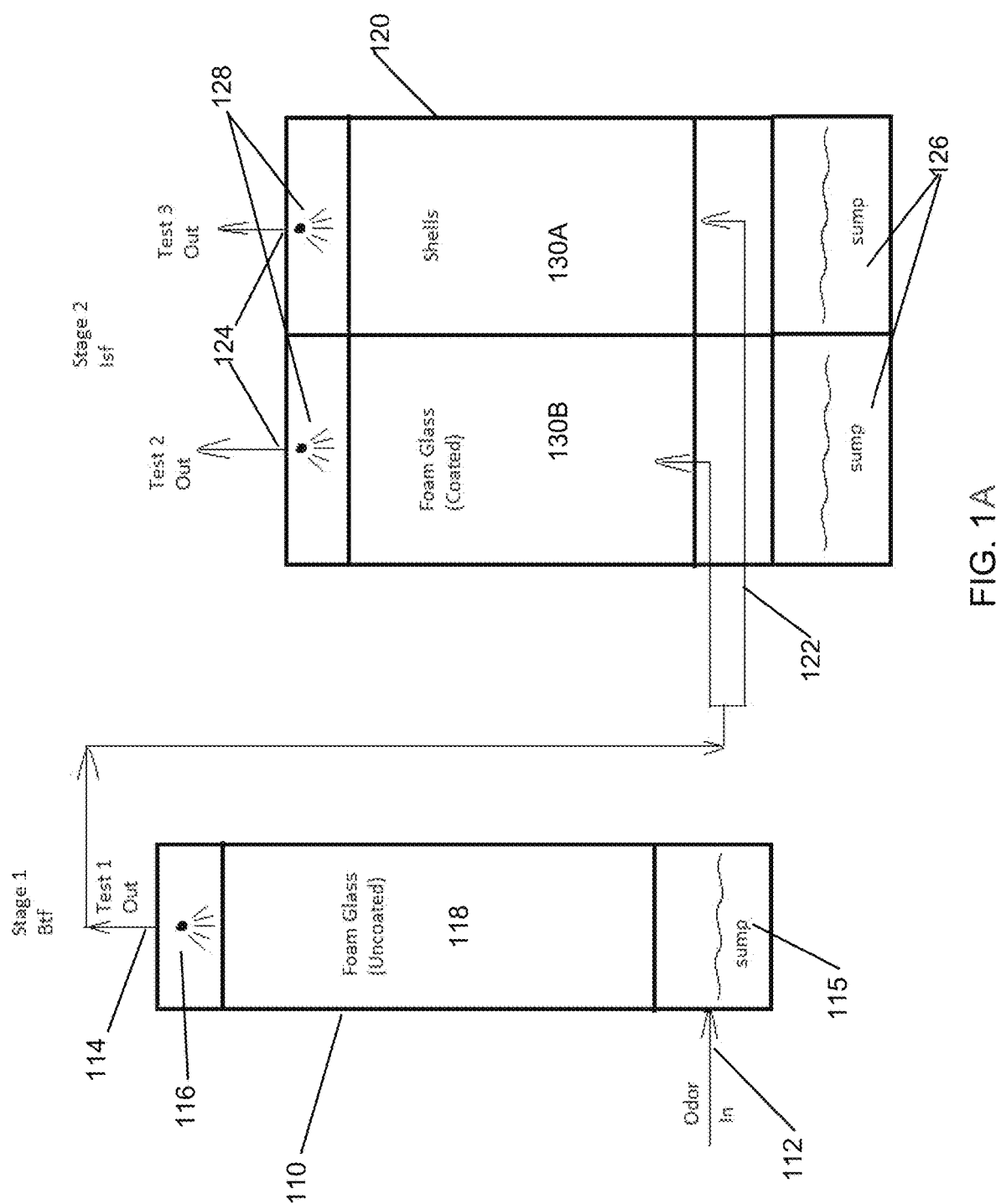
FIG. 1A is a schematic diagram illustrating a multi-stage treatment system according to another embodiment of the present disclosure.
Figure 3:
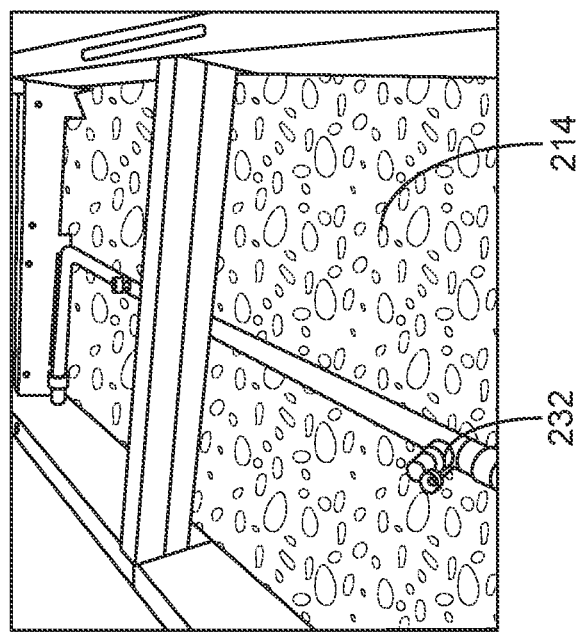
FIG. 3 is a top inside view of a biofilter vessel with a shell media packing.
Figure 2:
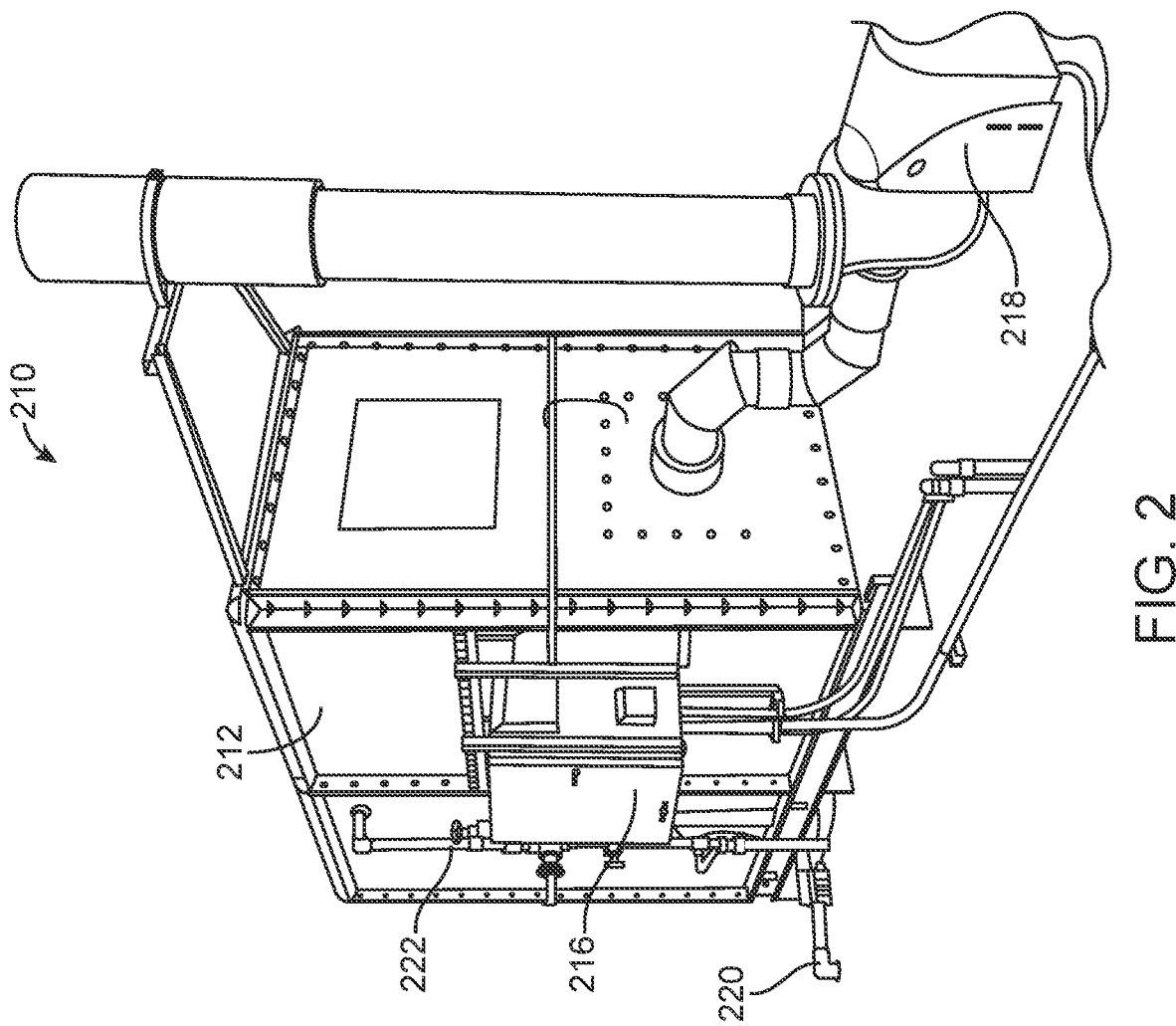
FIG. 2 is a perspective elevation of a bioscrubber or biofilter vessel and associated components in accordance with an embodiment of the present disclosure.

FIG. 1A schematically depicts an alternative, test embodiment setup for a multi-stage treatment system according to the present disclosure, which is configured to allow comparative testing of shell media packing with coated foamed glass aggregate media packing in the second stage. In this embodiment an initial stage bioscrubber may comprise containment vessel 110 with air inlet 112, air outlet 114, a centrifugal fan for driving air flow (not shown), a centrifugal pump for recirculating irrigating fluid (not shown), fluid recirculation reservoir (sump) 115, irrigation system 116 and media packing 118 derived from foam glass. Fluid from irrigation system 116 irrigates the media packing 118 as contaminated air is drawn through the vessel in a counter-current direction of the fluid flow. An initial stage bioscrubber can effectively provide a process for the microbial oxidation and removal of air contaminants, in particular hydrogen sulfide.

As further illustrated in FIG. 1A, a second or subsequent stage biofilter stage may comprise containment vessel 120, air inlet 122, air outlet 124, a centrifugal fan for driving airflow (not shown), a centrifugal pump for recirculating irrigating fluid (not shown), fluid recirculation reservoir (sump) 126, irrigation system 128, and separate media packings 130A/B derived from the calcareous exoskeleton of a bivalve mollusk and coated foam glass, respectively. With this test setup, identical inputs to the two different second stage media packings are provided for comparison purposes. Fluid from irrigation system 128 will irrigate the media packing 130A/B as contaminated air is drawn through the vessel 120 in a co-current direction of the fluid flow. A subsequent stage biofilter as described herein may effectively provide a process for the microbial oxidation and removal of air contaminants, particularly volatile organic compounds.

Additional features or aspects of embodiments described herein include containment of the effluent/waste air streams as close as possible to the contamination source. Wastewater undergoing turbulence through conveyance, collection, and/or treatment can produce odors and release dangerous gases containing sulfur or nitrogen based compounds and therefore should be isolated using covers or other structures. Ventilation can be an important aspect of well-designed systems in accordance with the present disclosure. Once the waste air stream is isolated, ventilated air may be routed to the treatment system. Depending on the contaminant concentration and the volume of air, ventilation may be achieved via ducting and extraction fans under low negative pressure conditions. The air stream is pulled through the system, rather than pushed, decreasing the risk of leaks.

In some embodiments, the physical structure and components of the first and second stages may be substantially similar other than diameters of the vessels and the filtration media employed for each stage. FIGS. 2, 3, 4A-C and 5 illustrate such embodiments. As illustrated therein, each stage 210 in the air contaminant removal process is generally comprised of odor control vessel 212 with internal irrigation pipework and nozzles, inlet/outlet deflectors, fiberglass grated flooring, PVC mesh (as elsewhere described herein). Filter media packing (Foamed Glass Aggregate or Shell Based) 214 resides inside vessel 212 (see, e.g., FIG. 3). A control panel equipped with a Variable Frequency Drive (VFD) 216 is provided for system control, providing integrated control of recirculation pumps and fans such as fan 218 with a variable speed motor and centrifugal or submersible pump 220 (not visible in FIG. 2, under concrete cover) for media irrigation. External irrigation pipework 222 may include components such as diaphragm valve 224, ball valve 226, line strainer 228, water pressure gauge 230 and differential pressure gauge 234. Spray nozzle assembly 232 distributes recirculated irrigation fluid across filter media packing 214.

Figure 6D:
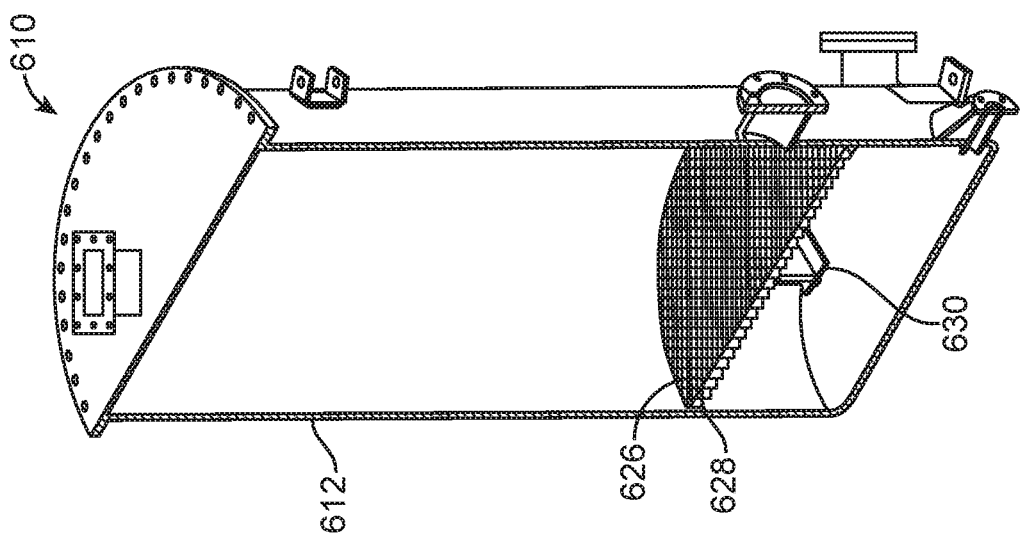
FIG. 6D is a cross-sectional perspective view of the bioscrubber shown in FIG. 6A.
Figure 6A:
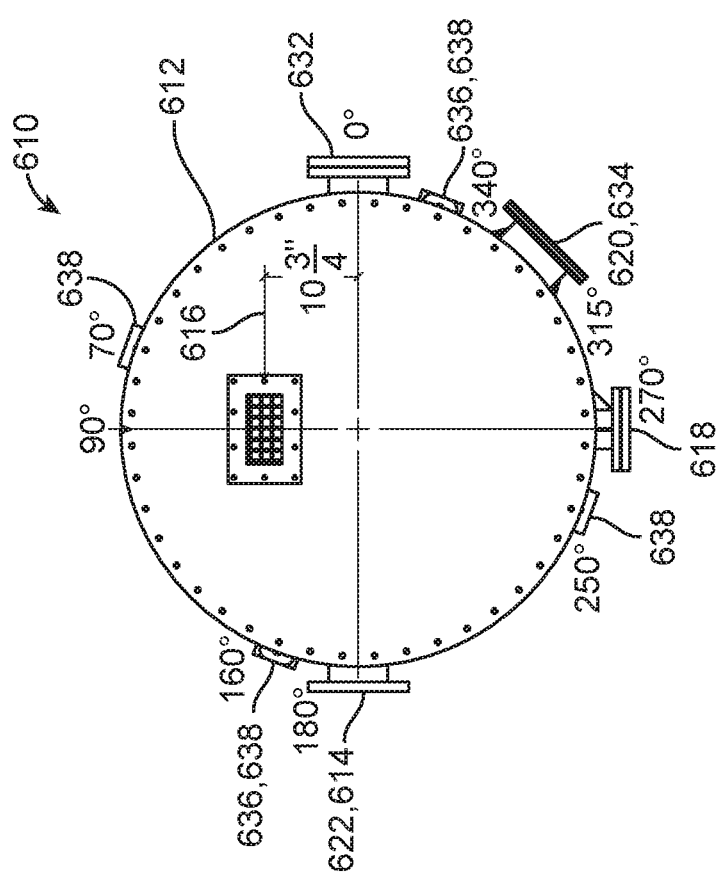
FIG. 6A is a top view of a bioscrubber vessel according to an embodiment of the present disclosure.
Figure 6C:
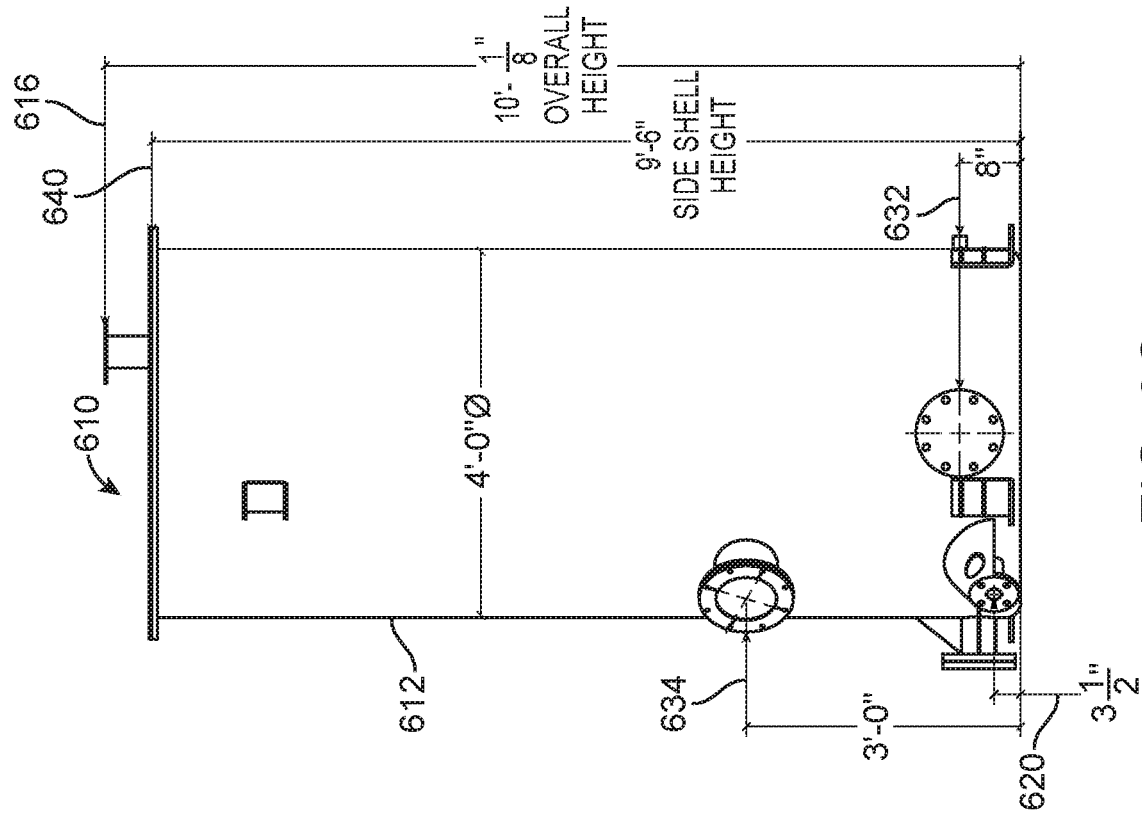
FIGS. 6B and 6C are, respectively, front and side elevation views of the bioscrubber shown in FIG. 6A.
Figure 6B:
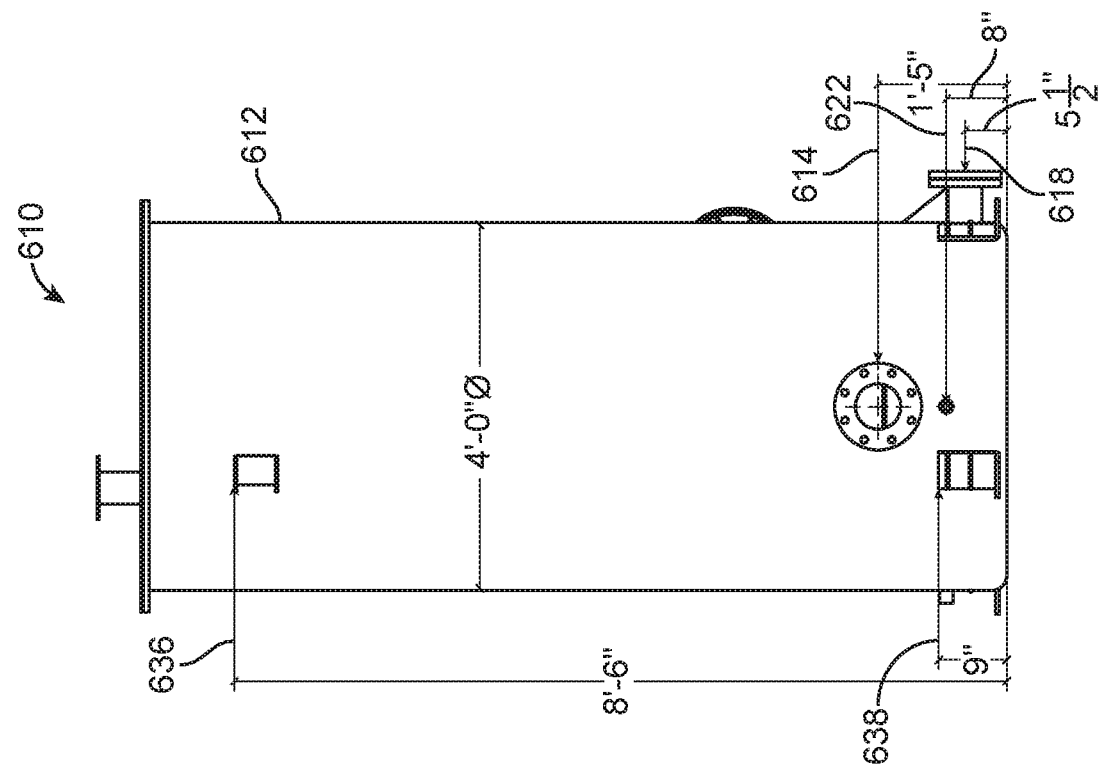
Figure 7D:
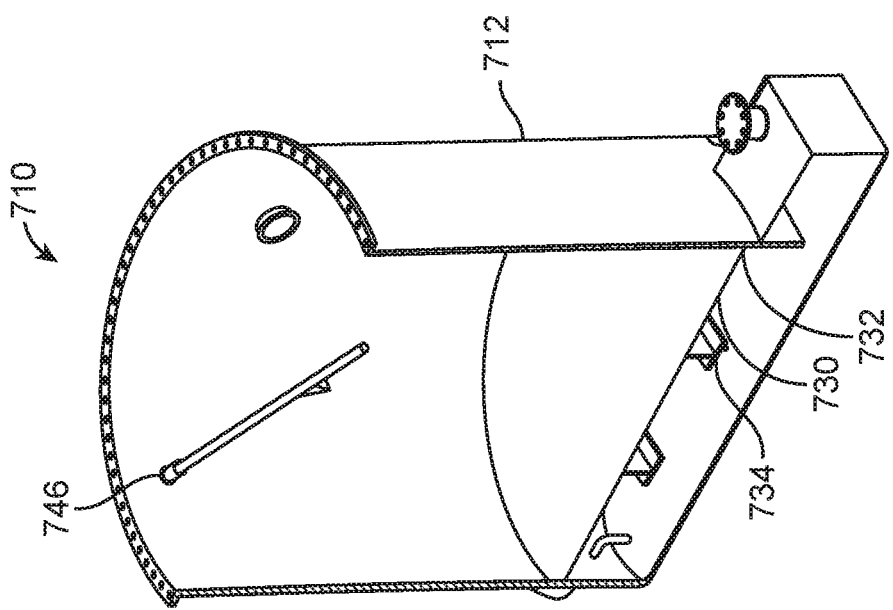
FIG. 7D is a cross-sectional perspective view of the bioscrubber shown in FIG. 7A.
Figure 7A:
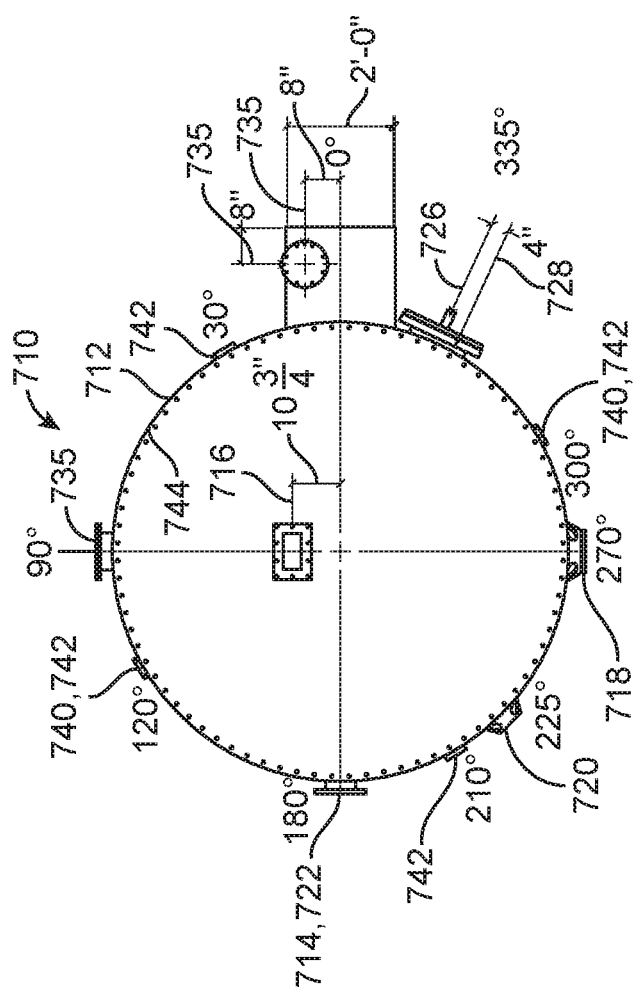
FIG. 7A is a top view of a biofilter vessel according to an embodiment of the present disclosure.
Figure 7B:
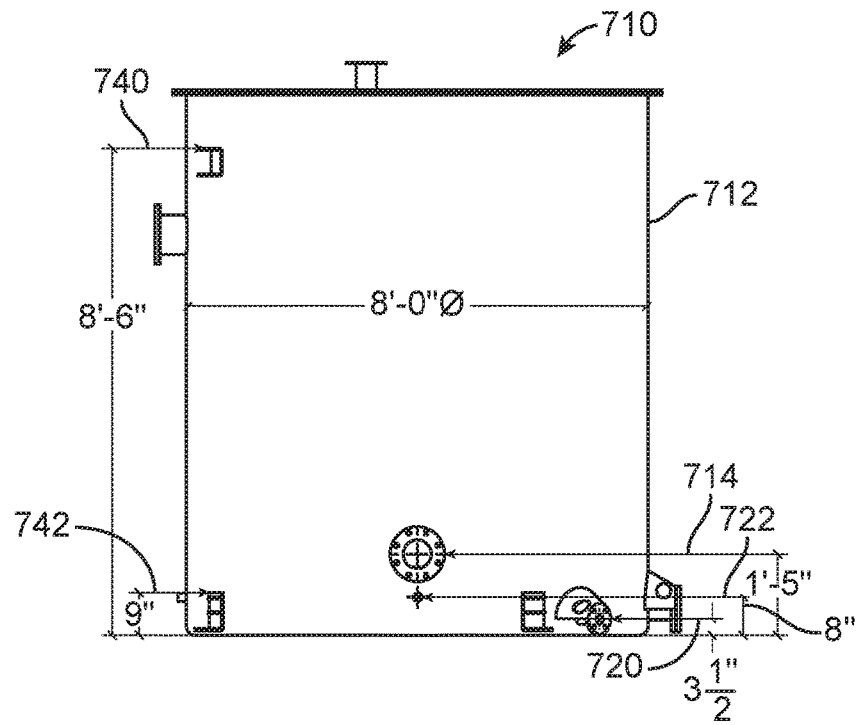
FIGS. 7B and 7C are, respectively, front and side elevation views of the bioscrubber shown in FIG. 7A.
Figure 7C:
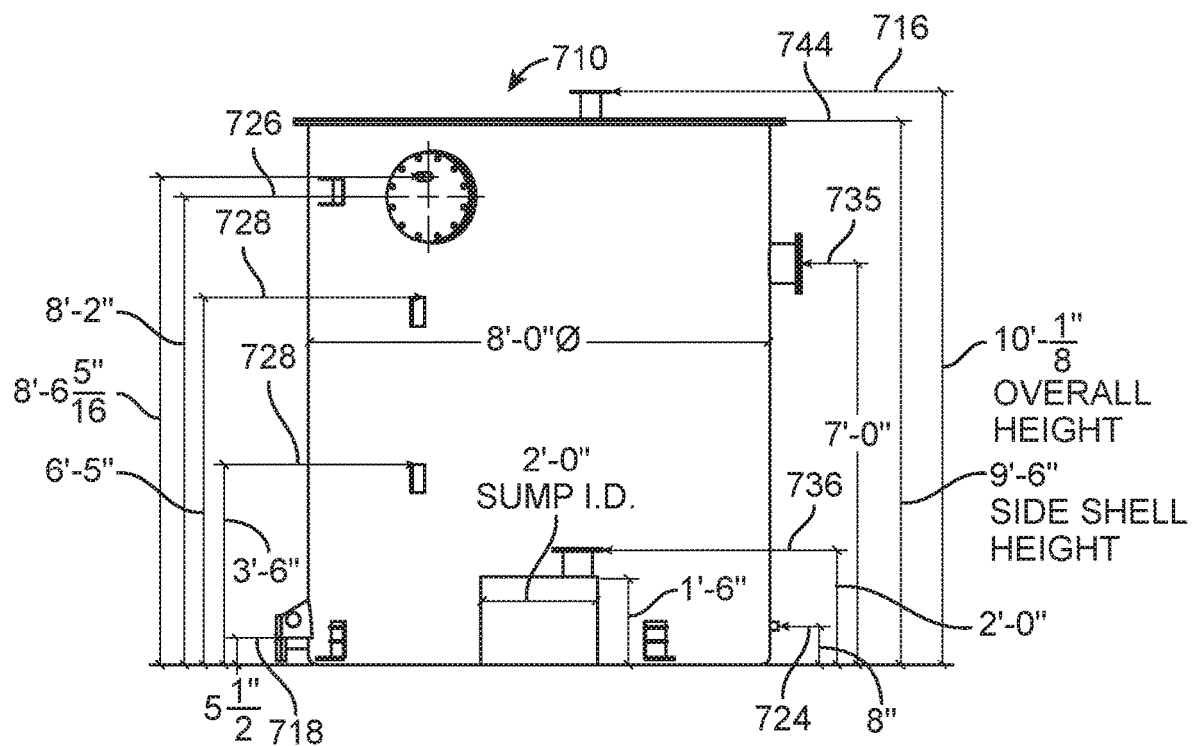

In one alternative embodiment, a first stage bioscrubber vessel may be constructed as shown in FIGS. 6A-C. As shown therein, vessel 610 may be configured as a generally cylindrical vessel with wall 612 formed of Fiberglass Reinforced Plastic (FRP) or similar materials. Vessel 610 is fitted with a 6" diameter 150# flange as air inlet 614. Air outlet 616 may comprise a 4"×8"×¼" thick non-standard flange. Flange cover 618 may comprise a 4" diameter 150# flange with a 15/16" thick cover. Drain flange 620 may be a 2" diameter 150# flange. Water supply connection 622 and an overflow connection each may be provided as a 1" diameter half-coupling female pipe thread with an internal 90 degree elbow and drop pipe. Media packing support grating 626 may comprise a 4'×12'×2" molded grating with 2"×2"×2" FR VE non-grit molded grating openings. Grating 626 is supported by support ring 628, which may be a 2"×½" ring welded or bolted internally to vessel wall 612. Grate 626 also may be supported with central support beam 630, which may be provided as a 6"×6"×⅜" WF-beam extending across the width of the vessel interior. Sump access door 632 may be provided as a 6" diam. 150# flange with a 1 1/16 thick cover. Media view port 634 may comprise 8"Ø PS15-69 flange with a ½" thick clear cover. Lifting points 636 and anchor points 638 may be provided, respectively, as 316 stainless lifting lugs and 316 stainless hold down lugs. Vessel cover 640 may be a 48" diam PS 15-69 flange with a ¼" thick cover plate.

In another alternative embodiment, second stage biofilter vessel 710 may be constructed as shown in FIGS. 7A-D. As shown therein, vessel 710 is formed of Fiberglass Reinforced Plastic (FRP) with vessel wall 712 in a generally cylindrical shape. Other suitable materials, such as high-density polyethylene (HDPE) or epoxy coated precast concrete may be used. Air inlet flange 714 is provided as a 6" diameter 150# flange and air outlet flange 716 is provided as a 4"×8" ¼" thick, non-standard flange. An access or drain opening 718 may be provided near the bottom of the vessel as a 4" diameter, 150# flange with a 15/16" thick cover. Drain 720 may be formed as 2" diameter 150# flange. Water supply connections 722 and overflow connection 724 may each be provided as 1" diameter half-coupling female pipe thread connectors with an internal 90° elbow and drop pipe. Spray header connection 726 may comprise a 12" diameter 50# flange with a 1½" diameter spray header mounted in a 1" thick PVC cover. Support tab 728 secures the pipe for spray header connection 726. Support tab 728 may comprise a 6"×6"×½" thick FRP support tab. Media packing support grating 730 may comprise a 4'×12'×2" molded grating with 2"×2"×2" FR VE non-grit molded grating openings. Grating 730 is supported by support ring 732, which may be a 2"×¾" ring welded or bolted internally to vessel wall 712. Grate 732 also may be supported with central support beam 734, which may be provided as a 8"×68"×⅜" WF-beam extending across the width of the vessel interior. Sump access door 736 may be provided as a 6" diameter PS15-69 flange with a ¼" thick cover. Media view port 735 may comprise 8"Ø PS15-69 flange with a ½" thick clear cover. Lifting points 740 and anchor points 742 may be provided, respectively, as 316 stainless lifting lugs and 316 stainless hold down lugs. Vessel cover 744 may be provided as a 96" diameter PS15-69 flange with a 0.313" thick cover. Spray header support 746 may comprise a 3" diameter×4" long FRP support pipe.

Example—First Stage Bioscrubber

In one example, a first stage bioscrubber includes an appropriate vessel as described herein with air inlets and outlets and a centrifugal fan to provide motive force to ventilate contaminated air to and through the bioscrubber vessel. A constant air flow rate will be maintained through the bioscrubber stage in order to achieve an Empty Bed Residence Time (EBRT) of between about 10 to about 30 seconds, and typically ≤20 seconds. This EBRT will allow for the appropriate contact time between microorganisms and air contaminants in order to provide high efficiency removal of contaminants. The bioscrubber vessel will be configured to maintain an air face velocity of between about 25 to about 50 seconds, and typically ≤40 seconds. Proper face velocity ensures even, preferably plug, airflow throughout media bed and prevents channeling. Inside the bioscrubber vessel, a series of spray nozzles with a 6.5 mm minimum bore diameter, are used to irrigate the foamed glass aggregate media with a biologically active fluid. Biologically active fluid is defined as water with a pH between 1.5-3.0, which is fed intermittently with a nutrient mixture comprised of varying percentages of phosphorus and nitrogen as may be determined by persons of ordinary skill based on specific microorganisms and vessel conditions. Dosing rate of nutrient feed will generally be in the range of about 0.005 to about 0.10 gallons per hour, and typically about 0.01 gallons per hour for a bioscrubber vessel of about 4 feet in diameter and 10 feet high. Motive force for irrigation of the foamed glass aggregate media is provided by an external centrifugal pump. A fluid reservoir is maintained at the bottom (e.g. in a sump) of the bioscrubber vessel. Biologically active fluid will be purged from the reservoir at a turnover rate of every 1 to 3 days, typically about 250 gallons per day in a bioscrubber vessel of approximate dimensions as mentioned above, to maintain the appropriate pH levels to facilitate the biological oxidation of air contaminants. Inorganic sulfur compounds such as hydrogen sulfide ($H2_S$) will be target air contaminants to be removed in the bioscrubber stage. Also, in this stage, a low percentage of ammonia ($NH_3$) removal will be achieved and organic compounds removal will be achieved due to the solubility of organic air contaminants. In the case of air streams containing hydrogen sulfide, the bioscrubber stage will provide an environment in which an autotrophic bacteria, such as *Thiobacillus* species, thrives and colonizes in thin sheets on the surface area of the foamed glass aggregate media bed. *Thiobacillus* species oxidizes hydrogen sulfide and the resulting byproducts are removed via the irrigation system.

Example—Second Stage Biofilter

In another example, in a second stage, contaminated air from the first stage bioscrubber is directed into a biofilter vessel as described herein. A constant air flow rate will be maintained through the bioscrubber stage in order to achieve an Empty Bed Residence Time (EBRT) of between about 30 to about 50 seconds, and typically ≤40 seconds in a biofilter vessel with approximate dimensions of 8 feet in diameter and 10 feet tall. This EBRT will allow for the appropriate contact time between microorganisms and air contaminants in order to provide high efficiency removal of contaminants. The biofilter vessel will be configured to maintain an air face velocity of between about 5 to 15 seconds, and typically ≤10 seconds in a biofilter vessel with dimensions as mentioned above. Proper face velocity ensures even airflow throughout media bed and prevents channeling. Inside the biofilter vessel, a series of spray nozzles with a 6.5 mm minimum bore diameter, are used to irrigate the shell media with a neutral irrigation fluid. Neutral irrigation fluid is defined as water from a potable or reclaimed source meeting the following criteria:

TABLE 1

| Neutral Irrigation Fluid Properties (approximate) | |
|---|---|
| pH: 6.0-7.5 | Chlorine: <1.0 mg/l |
| BOD: <10 mg/l | Chloride <250 mg/l |
| Total Suspended Solids: <10 mg/l | Surfactants (lauryl sulfate): <0.20 mg/l |
| Iron: <0.20 mg/l | Dissolved/emulsified Hydrocarbons: <0.01 mg/l |
| Manganese: <0.05 mg/l | Bisulfite <0.5 mg/l |
| Zinc: <1.00 mg/l | Ammonia <5 mg/l |
| Copper: <0.50 mg/l | |

A fluid reservoir is maintained at the bottom (e.g., in a sump) of the biofilter vessel. Neutral irrigation fluid will be purged from the reservoir at a turnover rate of every 3 to 7 days, to maintain the appropriate pH levels to facilitate the biological oxidation of air contaminants. Neutral irrigation fluid may be continuous or intermittent flow depending on contaminant concentrations. Volatile Organic Compounds (VOCs) such as Methyl Mercaptan ($CH4S$) and Dimethyl Sulfide ($(CH3)2S$) will be target air contaminants to be removed in the biofilter stage. The biofilter stage will provide an environment conducive to the proliferation of heterotrophic and chemoautotrophic bacteria. Heterotrophic bacteria colonize in thick masses on the shell media and thrive in suspension within the neutral irrigation fluid. Heterotrophic bacteria excrete extracellular hydrolytic enzymes in order to degrade complex organic compounds. Chemoautotrophic bacteria break down ammonia compounds. In such an exemplary system, the shell media bed within the biofilter may perform one or more of the following functions: act as a carrier substrate for microorganisms; provide supplementary nourishment (trace nutrients) for microorganisms; support humidity storage and help maintain pH within desired range.

Example—Performance Test

Performance testing involves measuring inlet and outlet air contaminant concentrations to determine removal efficiency. Removal efficiency (RE) can be determined using the following formula based on Average Contaminant values (CAvg) measured in parts per million (ppm):

RE=[(Inlet CAvg−Outlet CAvg)/Inlet CAvg]*100

The resultant value is Removal Efficiency measured as a percentage.

Performance testing can be conducted on multi-stage treatment systems (bioscrubber+biofilter) to determine total air contaminant removal. Such testing can determine removal efficiencies of inorganic and organic air contaminant compounds. Additionally, each treatment stage can be tested independently to determine the specific contribution of each stage to total air contaminant removal, and to determine removal efficiencies of inorganic and organic air contaminant compounds.

Performance testing for inorganic contaminant removal may involve the use of a Low Range Sampling System-2 (LRSS-2). This portable two-point sampling unit, provided by Detection Instruments, houses two Odalog H2S sensors capable of logging hydrogen sulfide concentrations over time. The air inlet preceding the bioscrubber stage is connected to a high range Odalog sensor capable of measuring concentrations between 0 and 1000 ppm H2S. The air inlet preceding the bioscrubber stage is connected to a mid-range Odalog sensor capable of measuring 0 to 50 ppm H2S. The air outlet following the biofilter stage is connected to a low-range Odalog sensor capable of measuring 0-2.0 ppm H2S at high resolution.

Performance testing for organic contaminant removal may involve the use of Tedlar gas sampling bags. Tedlar bags are equipped with a polypropylene valve which can be connected to a pump to manually draw composite gas samples. Gas samples can be laboratory tested to determine the exact composition of air contaminants present. Tedlar bag gas sampling can be conducted at the inlet and outlet of each stage to determine the individual contribution of each stage to air contaminant removal as well as the total air contaminant removal efficiency of the entire multi-stage process.

Example—Prophetic Results

It is anticipated that performance testing as described above will establish the following removal efficiency per air contaminant category:

| | |
|---|---|
| Inorganic air contaminant removal per compound (bioscrubber stage) | ≥95% RE |
| Inorganic air contaminant removal per compound (biofilter stage) | ≥4% RE |
| Inorganic air contaminant removal per compound (multi-stage system) | ≥99% RE |
| Organic air contaminant removal per compound (bioscrubber stage) | ≥4% RE |
| Organic air contaminant removal per compound (biofilter stage) | ≥95% RE |
| Organic air contaminant removal per compound (multi-stage system) | ≥99% RE |

It is anticipated that a multi-stage system as described in examples herein will achieve these air contaminant removal rates for a total of 1 inorganic compound plus 3 organic compounds per test.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. Air treatment system, comprising:
a first treatment stage comprising a first stage vessel with an air inlet disposed in a lower portion of the vessel and an air outlet disposed in an upper portion of the vessel, the first stage vessel containing a foamed glass aggregate media, an irrigation system configured to recirculate irrigation fluid from a bottom drain area to irrigation outlets above the foamed glass aggregate media to provide counter-current flow of irrigation fluid with respect to air flow from the first stage inlet to the first stage outlet;
a second treatment stage comprising a second stage vessel with an air inlet disposed in an upper portion of the vessel and an air outlet disposed in a lower portion of the vessel, the second stage vessel containing a shell media, an irrigation system configured to recirculate irrigation fluid from a bottom drain area to irrigation outlets above the shell media to provide co-current flow of irrigation fluid with respect to air flow from the second stage inlet to the second stage outlet; and
a negative pressure source communicating with the second stage outlet to draw air through said first and second stage vessels;
wherein said first stage outlet communicates with said second stage inlet.

2. The air treatment system of claim 1, wherein the foamed glass aggregate media is configured to support autotrophic microorganisms.

3. The air treatment system of claim 1, wherein the shell media is configured to support at least one of heterotrophic and chemoautotrophic microorganisms.

4. The air treatment system of claim 1, wherein said media in each said vessel are supported on a grate defining a plenum there below and wherein the first stage air inlet enters into the first stage plenum and the second stage air outlet exits from the second stage plenum.

5. The air treatment system of claim 4, wherein each said vessel defines an irrigation fluid drain below each said plenum, each said drain in fluid communication with an irrigation pump.

6. The air treatment system of claim 1, wherein said irrigation outlets comprise spray nozzles connected to said pumps, respectively by irrigation piping.

7. The air treatment system of claim 1, wherein said negative pressure force comprises a centrifugal fan that delivers the treated airstream to a no-loss stack.

8. The air treatment system of claim 1, wherein the first stage vessel has a vessel diameter that is approximately 50% of the second stage vessel diameter.

9. The air treatment system of claim 1, wherein the first stage vessel contains a *Thiobacillus* bacteria species and the second stage vessel contains at least one of a *Nitrosomonas, Nitrobacter, Rhodococcus*, and *Pseudomonas* bacteria species.

10. An air treatment system, comprising
a first treatment stage comprising a first stage vessel containing a *Thiobacillus* bacteria species supported on a media substrate, the first stage vessel defining a first stage air stream inlet and a first stage air stream outlet and having an irrigation system configured to recirculate irrigation fluid through the media substrate in counter-current direction with respect to air stream flow from the first stage inlet to the first stage outlet;

a second treatment stage comprising a second stage vessel containing at least one of a *Nitrosomonas* and *Nitrobacter* bacteria species and at least one of *Rhodococcus* and *Pseudomonas* bacteria species supported on a media substrate, the second stage vessel defining a second stage air stream inlet and a second stage air stream outlet and having an irrigation system configured to recirculate irrigation fluid through the media substrate in a co-current direction with respect to air stream flow from the second stage inlet to the second stage outlet; and said first stage air stream outlet communicating with said second stage air stream inlet.

11. The air treatment system of claim 10, first stage media is foamed glass aggregate media.

12. The air treatment system of claim 10, wherein the second stage media is a shell media.

13. The air treatment system of claim 10, wherein:
the first stage media substrate forms a media packing contained within a first stage vessel;
the second stage media substrate forms a media packing contained within a second stage vessel; and
the first stage vessel has a diameter that is between about 25% to about 65% smaller than the second stage vessel diameter.

14. The air treatment system of claim 13, further comprising a negative pressure source disposed at the second stage outlet to maintain a substantially constant volumetric air stream flow rate with through said system with a greater face velocity flow rate in the first stage vessel as compared to in the second stage vessel.

15. A method for treating an air stream to remove contaminants, comprising
directing the air stream through a first media bed counter-current to a flow of irrigating fluid through the first media bed, said first media bed comprising a substrate for autotrophic microorganisms adapted to consume hydrogen sulfide contained within the air stream;
removing about 80-95% of hydrogen sulfide from the air stream in the first media bed;
directing the air stream from the first media bed through a second media bed co-current with a flow of irrigating fluid through the second media bed, the second media bed comprising a shell media as a substrate for heterotrophic and chemoautotrophic microorganisms; and
removing substantially all remaining hydrogen sulfide, at least about 95% of ammonia, dimethyl sulfide when present and methyl mercaptan when present from the air stream in the second media bed.

16. The method of claim 15, wherein the first media bed comprises a foamed glass aggregate media packing disposed within a vessel.

17. The method of claim 16, wherein the autotrophic microorganisms comprise a *Thiobacillus* bacteria species.

18. The method of claim 15, wherein the second media bed comprises a shell media packing disposed within a vessel.

19. The method of claim 18, wherein the heterotrophic microorganisms comprise at least one of a *Nitrosomonas* and *Nitrobacter* bacteria species, at least one of *Rhodococcus* and *Pseudomonas* bacteria species, and at least one fungi species.

20. The method of claim 15, further comprising applying a negative air pressure to the second media bed to draw the air stream through the first and second media beds.

* * * * *